(12) United States Patent
Weir et al.

(10) Patent No.: US 9,057,329 B2
(45) Date of Patent: Jun. 16, 2015

(54) TURBOPROP ENGINE SYSTEMS WITH NOISE REDUCING INLET ASSEMBLIES

(75) Inventors: Don Weir, Scottsdale, AZ (US);
Yogendra Yogi Sheoran, Scottsdale, AZ (US); Doug Hollingshead, Phoenix, AZ (US); Peter Hall, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 642 days.

(21) Appl. No.: 13/402,096

(22) Filed: Feb. 22, 2012

(65) Prior Publication Data
US 2013/0216371 A1 Aug. 22, 2013

(51) Int. Cl.
*F04D 29/66* (2006.01)
*F02C 6/20* (2006.01)
*F02C 7/045* (2006.01)

(52) U.S. Cl.
CPC ............... *F02C 6/206* (2013.01); *F02C 7/045* (2013.01); *F05D 2220/325* (2013.01); *F05D 2210/40* (2013.01); *F05D 2220/324* (2013.01); *Y02T 50/672* (2013.01)

(58) Field of Classification Search
CPC ............ F01D 1/02; F01D 1/023; F01D 9/02; F01D 9/04; F04D 29/66; F04D 29/663; F04D 29/664; F04D 29/665; F04D 29/667

USPC ............ 415/55.1, 119, 182.1, 184, 185, 144; 416/90 R, 90 A, 93 R, 94, 93 A; 187/207, 187/210, 214, 222

See application file for complete search history.

(56) References Cited

U.S. PATENT DOCUMENTS

| 3,095,696 | A | * | 7/1963 | Rumble | 60/770 |
| 4,240,250 | A | * | 12/1980 | Harris | 60/39.093 |
| 4,501,393 | A | | 2/1985 | Klees et al. | |
| 2004/0165986 | A1 | * | 8/2004 | Parker et al. | 415/220 |
| 2010/0116583 | A1 | * | 5/2010 | Seedorf | 181/205 |
| 2011/0139000 | A1 | | 6/2011 | Pavlatos | |

* cited by examiner

*Primary Examiner* — Edward Look
*Assistant Examiner* — Aaron R Eastman
(74) *Attorney, Agent, or Firm* — Ingrassia Fisher & Lorenz, P.C.

(57) ABSTRACT

An inlet assembly for a turboprop engine system is provided. The inlet assembly includes an inlet plenum defining first inlet configured to receive air from the atmosphere; an expansion plenum coupled to the inlet plenum and configured to receive the air from the inlet plenum, the inlet plenum and the expansion plenum defining a flow path for the air with a bend of at least 90°; and a second inlet coupled to the expansion plenum and configured to receive the air from the expansion plenum.

18 Claims, 10 Drawing Sheets

TURBOPROP ENGINE SYSTEMS WITH NOISE REDUCING INLET ASSEMBLIES

TECHNICAL FIELD

The present invention generally relates to turboprop engine systems, and more particularly relates to turboprop engine systems with noise reducing inlet assemblies.

BACKGROUND

A turboprop engine system is an aircraft engine system with propellers driven by an engine via one or more shafts and a gearbox. Generally, the propellers of a turboprop engine system are not surrounded by a duct, nacelle, or cowling and project from the front end of the engine system. During operation, air enters the turboprop engine system from an inlet underneath the propellers or two inlets, one on each side of the propellers, to be compressed, mixed with fuel, and combusted to drive the propellers. Such turboprop engine systems may be mounted on the undersides of wings or in the nose cowling of a fixed wing aircraft to power the aircraft with the thrust generated by the rotating propeller(s).

Some conventional turboprop engine systems may have an issue with noise, particularly noise generated by the engine itself. Such noise may be undesirable, especially from the perspective of passengers of the aircraft and ground crews that service the aircraft. In many systems, noise from the engine may travel from the engine out of the engine inlet at the front of the turboprop engine system.

Accordingly, it is desirable to reduce the amount of noise propagation associated with turboprop engine systems, particularly noise that travels from the engine out of the engine inlet. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an inlet assembly for a turboprop engine system is provided. The inlet assembly includes an inlet plenum defining first inlet configured to receive air from the atmosphere; an expansion plenum coupled to the inlet plenum and configured to receive the air from the inlet plenum, the inlet plenum and the expansion plenum defining a flow path for the air with a bend of at least 90°; and a second inlet coupled to the expansion plenum and configured to receive the air from the expansion plenum.

In accordance with another exemplary embodiment, a turboprop engine system is provided. The system includes an engine with an engine inlet; a shaft coupled to the engine and configured to be rotated by the engine; a cowling enclosing the engine and the shaft; a propeller positioned outside of the cowling, the propeller being coupled to the shaft and configured to be driven by the shaft; and an inlet assembly with an aircraft inlet, the inlet assembly configured to receive air from the atmosphere through the aircraft inlet and to provide the air to the engine inlet of the engine. The inlet assembly includes a first plenum at least partially defining a flow path for the air between the aircraft inlet and the engine inlet. The first plenum has a bend of at least 90°.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to turboprop engine systems with noise reducing inlet assemblies. Particularly, the inlet assembly includes an inlet plenum that extends from an aircraft inlet to an expansion plenum, which itself extends to an engine inlet coupled to the engine compressor. Collectively, the inlet plenum and expansion plenum form a generally tortuous flow path within the inlet assembly, e.g., an annular flow path that extends about the gearbox and/or engine shaft and/or a flow path with a bend that changes the axial air flow direction at least 180°. The expansion chamber upstream of the engine inlet has a larger volume than the engine inlet to provide noise attenuation for noise generated by the air traveling through the engine inlet. Additionally, sound-absorbing materials may be arranged along the plenums to further attenuate noise. A blocking plate may be positioned proximate to the engine inlet to additionally block or absorb sound traveling through the engine inlet. The expansion chamber, sound absorbing material, and/or blocking plate function to reduce noise from the engine from traveling out of the turboprop engine system.

Figure 1:
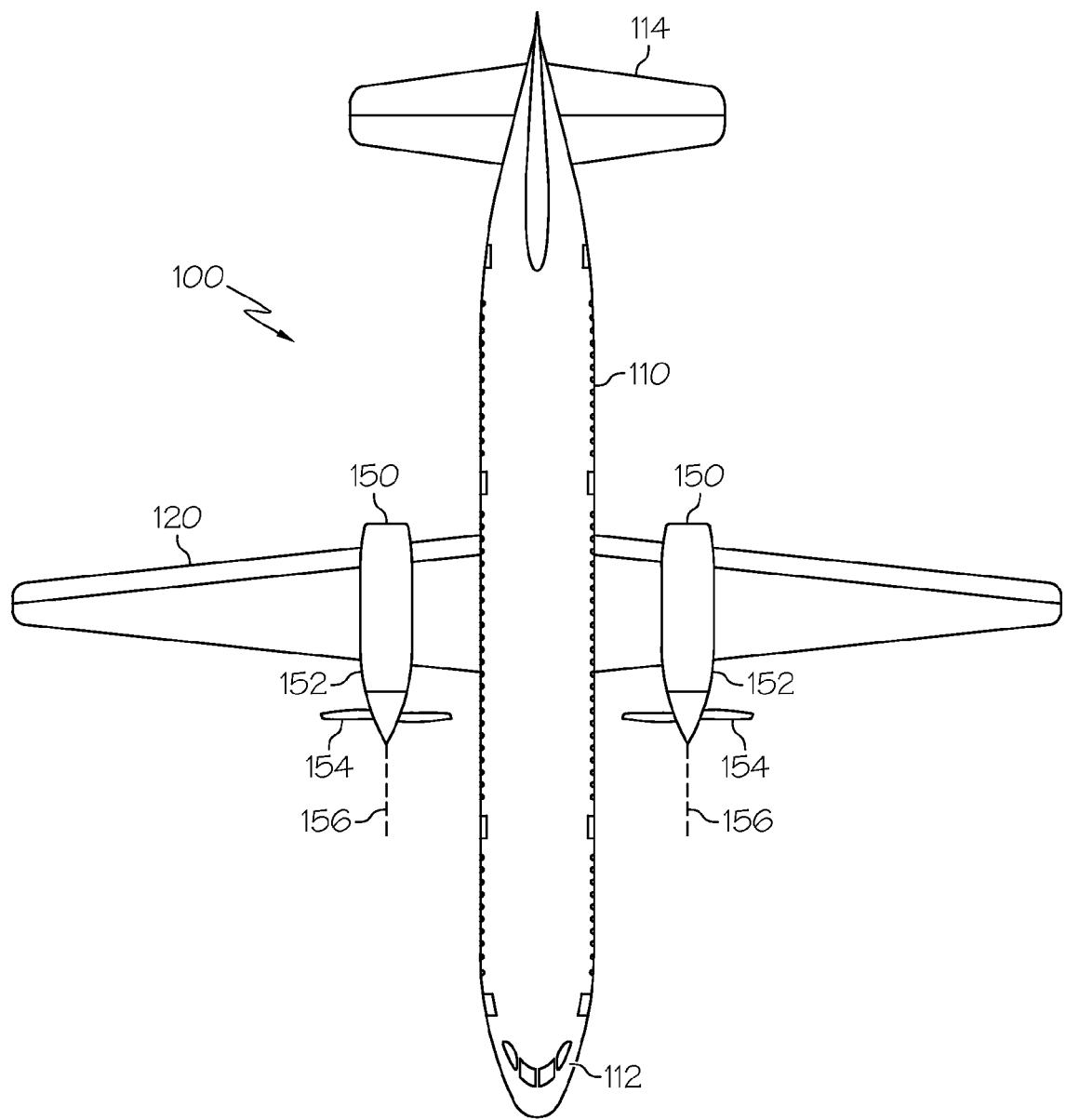
FIG. 1 is a top plan view of an aircraft with turboprop engine systems according to an exemplary embodiment.

FIG. 1 is a top plan view of an aircraft 100 according to an exemplary embodiment. As is generally known, an aircraft 100 includes a fuselage 110 capable of carrying passengers, a cockpit 112 in the front, and a tail 114 in the back. Wings 120 are attached to either side of the fuselage 110, and a turboprop engine system (a "turboprop") 150 is attached to each wing 120. As described in greater detail below, each turboprop 150 includes a cowling (or nacelle) 152 that encloses a gas turbine engine (described below) and a propeller 154 on the forward end of the turboprop 150. The cowling 152 may be, for example, an aluminum or composite material. The propellers 154 are selectively powered by the gas turbine engine about rotational axis 156 to provide a forward thrust to the aircraft 100. In the depicted embodiment, two turboprops 150 are shown, although in other embodiments, alternative configurations and arrangements of the turboprops 150 may be provided. For example, a single turboprop may be positioned in the nose cowling of a single engine aircraft.

Figure 2:
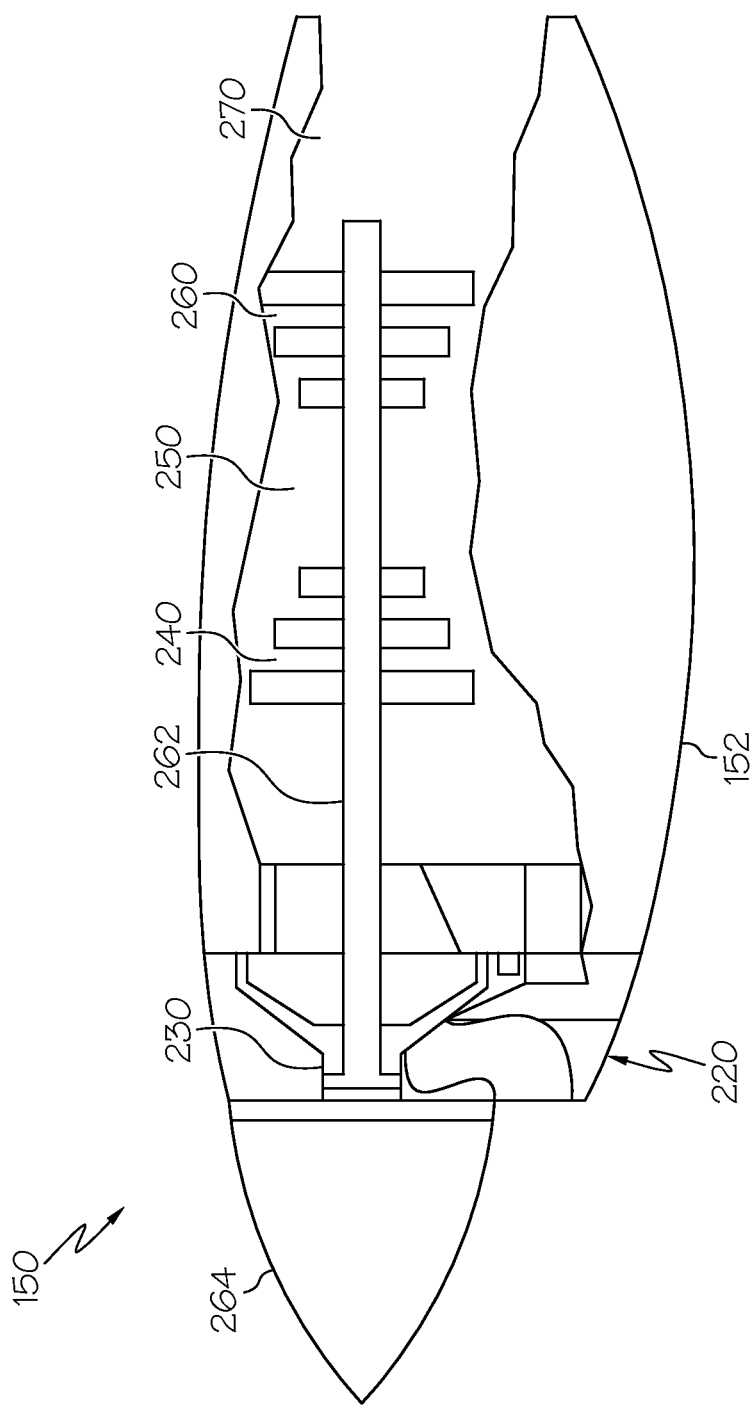
FIG. 2 is a schematic axial cross-sectional view of a turboprop engine system according to an exemplary embodiment.

FIG. 2 is a schematic cross-sectional view of a turboprop engine system (e.g., turboprop 150 of FIG. 1) according to an exemplary embodiment. The turboprop 150 may include an inlet assembly 220, a gearbox 230, a compressor section 240, a combustion section 250, a turbine section 260, and an exhaust section 270 disposed within the cowling 152. The compressor section 240, the combustion section 250, the turbine section 260, and the exhaust section 270 may collectively be referred to as the "engine" below.

During operation, air enters the inlet assembly 220 and is directed into the compressor section 240. Additional information about the inlet assembly 220 is provided below. The compressor section 240 may include a series of compressors that raise the pressure of the air directed into the combustion section 250. In the combustion section 250, the high pressure air is mixed with fuel and combusted. The combusted air is then directed into the turbine section 260. The turbine section 260 may include a series of turbines, which may be disposed in axial flow series. The combusted air from the combustion section 250 expands through and rotates the turbines of the turbine section 260. From the turbine section 260, the air is then exhausted through the exhaust section 270 to the atmosphere.

In one exemplary embodiment, the turbines of the turbine section 260 are coupled to one or more shafts 262 to thereby drive equipment in the turboprop 150. Specifically, the turbines may drive the compressors of the compressor section 240. The shaft 262 is additionally coupled to a hub (or nose) 264 via the gearbox 230. The propellers 154 (FIG. 1) are mounted on the hub 264 such that the turbine section 260 may drive the propellers 154 to provide thrust for the turboprop 150, and as a result, the aircraft 100 (FIG. 1).

Operation of the turboprop 150 may generate noise at undesirable levels, particularly for passengers of the aircraft 100 (FIG. 1) and ground crews working in the vicinity of the aircraft 100. For example, the engine noise may be compression noise produced by the air from the inlet assembly 220 being compressed by the compression section 230, core noise associated with the combustion process in the combustion section 250, or turbine noise associated with the interaction of high velocity gases within the turbine section 260. As described below, exemplary embodiments of the inlet assembly 220 function to attenuate noise associated with the turboprop 150.

Figure 3:
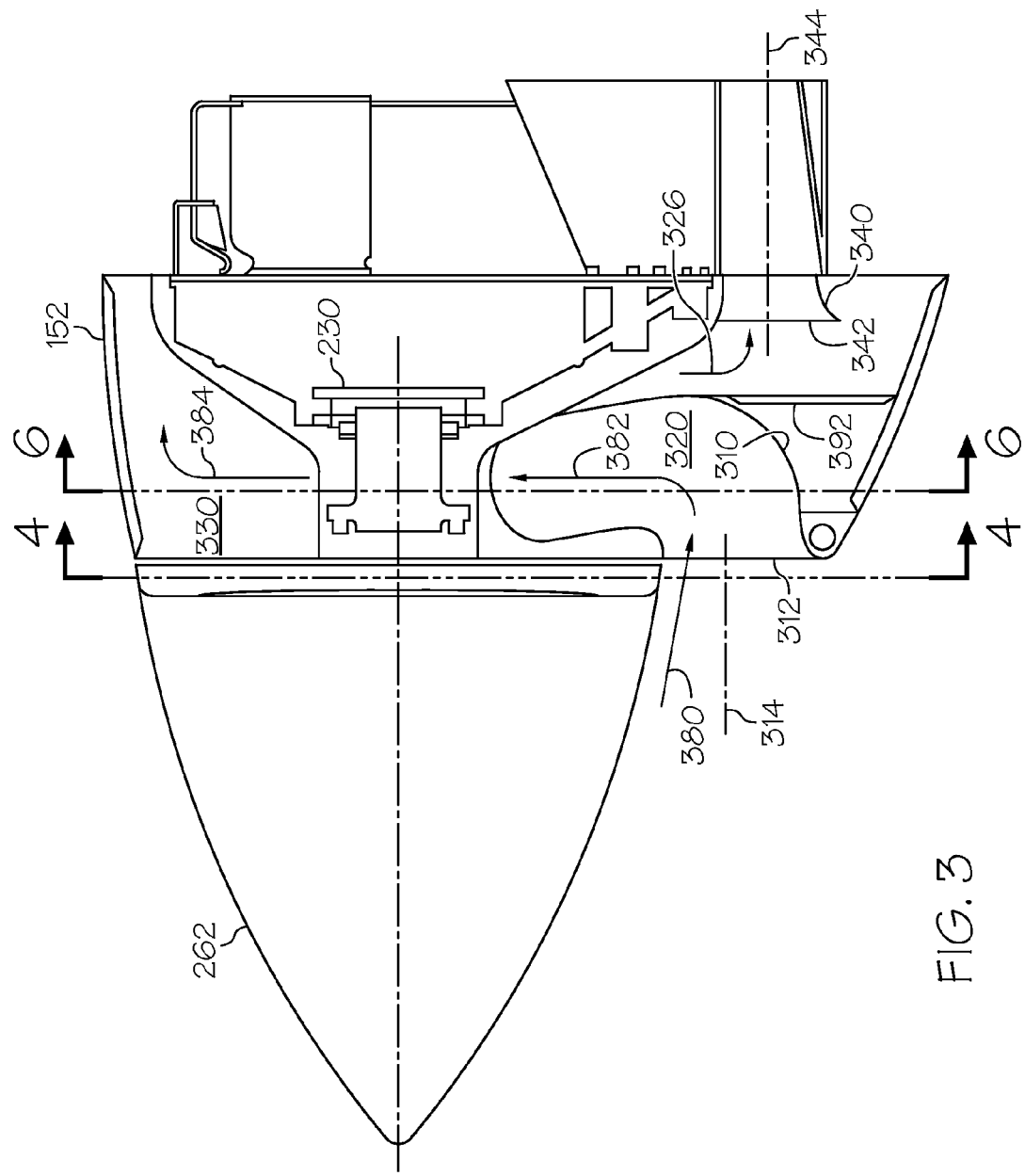
FIG. 3 is a more detailed axial cross-sectional view of an inlet assembly of the turboprop engine system of FIG. 2 according to an exemplary embodiment.
Figure 4:
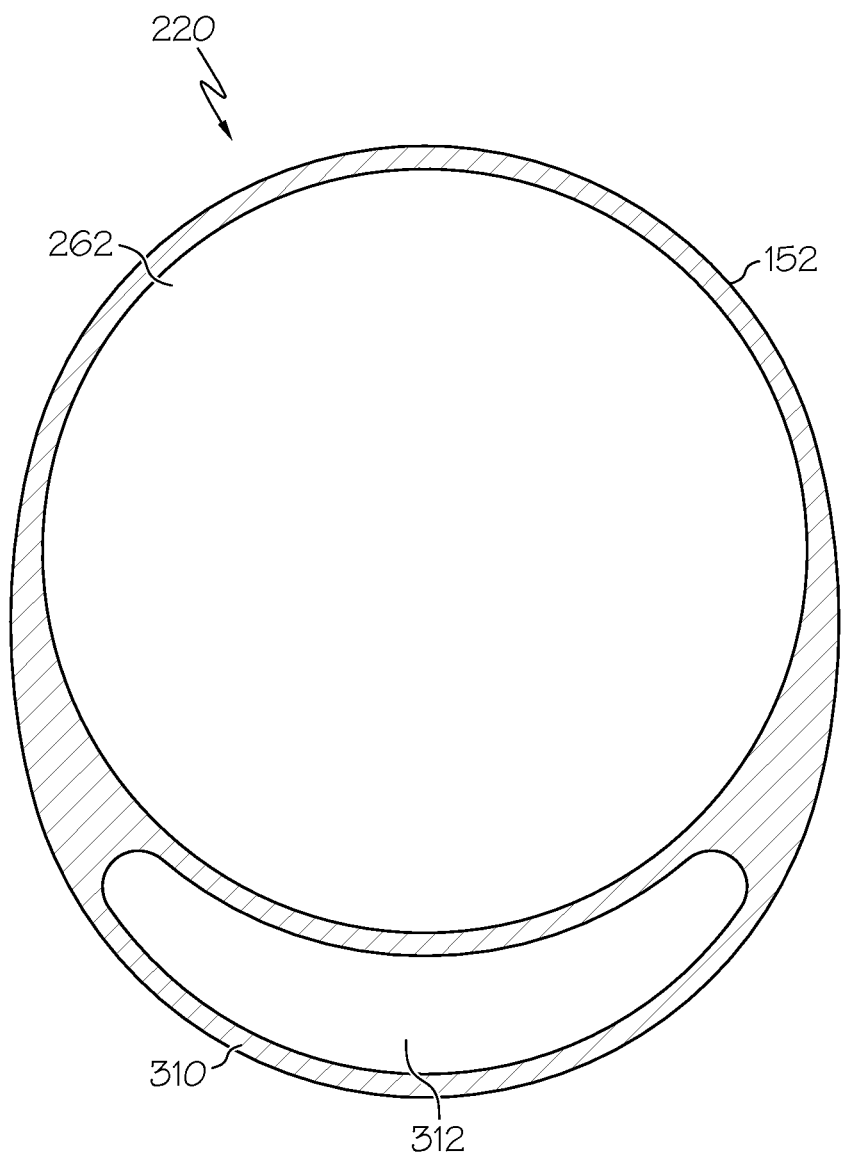
FIG. 4 is a radial cross-sectional view of the inlet assembly of FIG. 3 through line 4-4 according to an exemplary embodiment.
Figure 5:
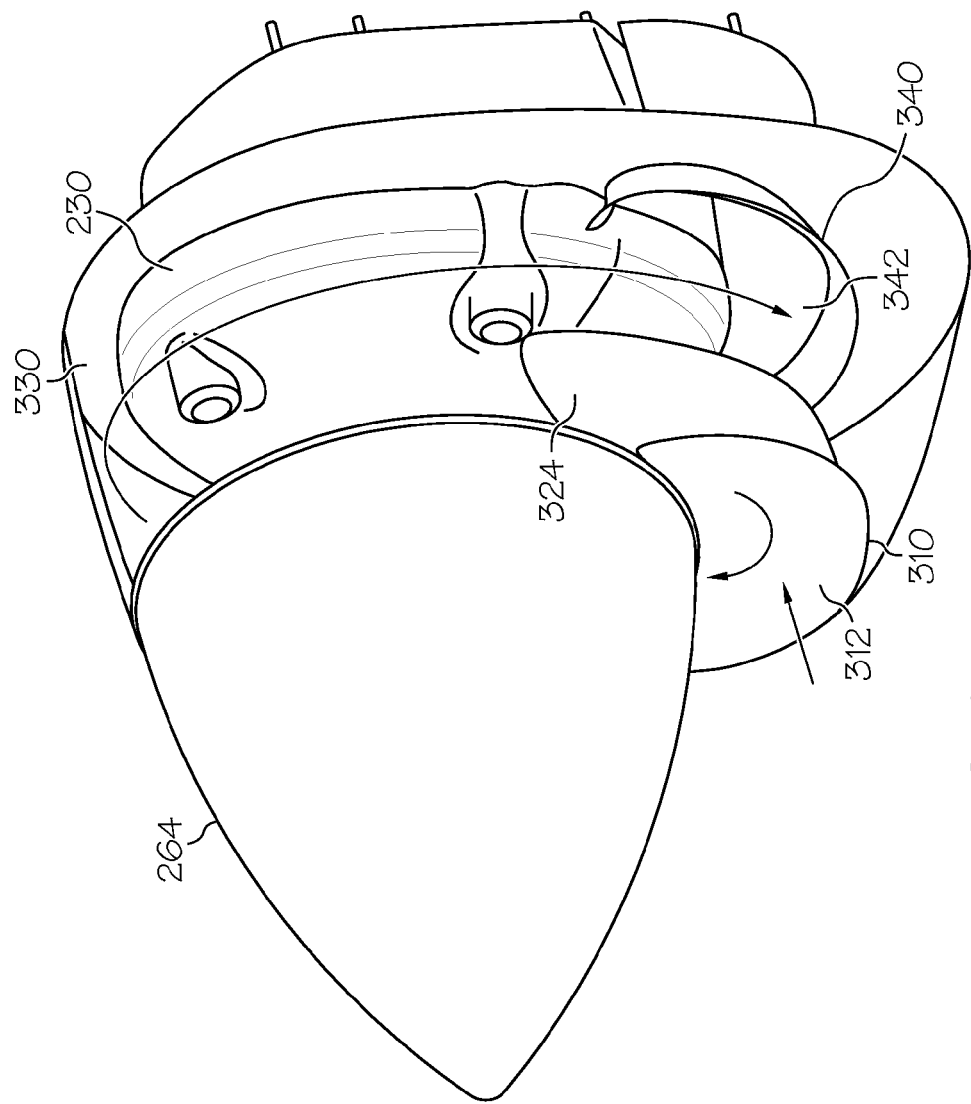
FIG. 5 is a partial isometric view of the inlet assembly of FIG. 3 according to an exemplary embodiment.
Figure 6:
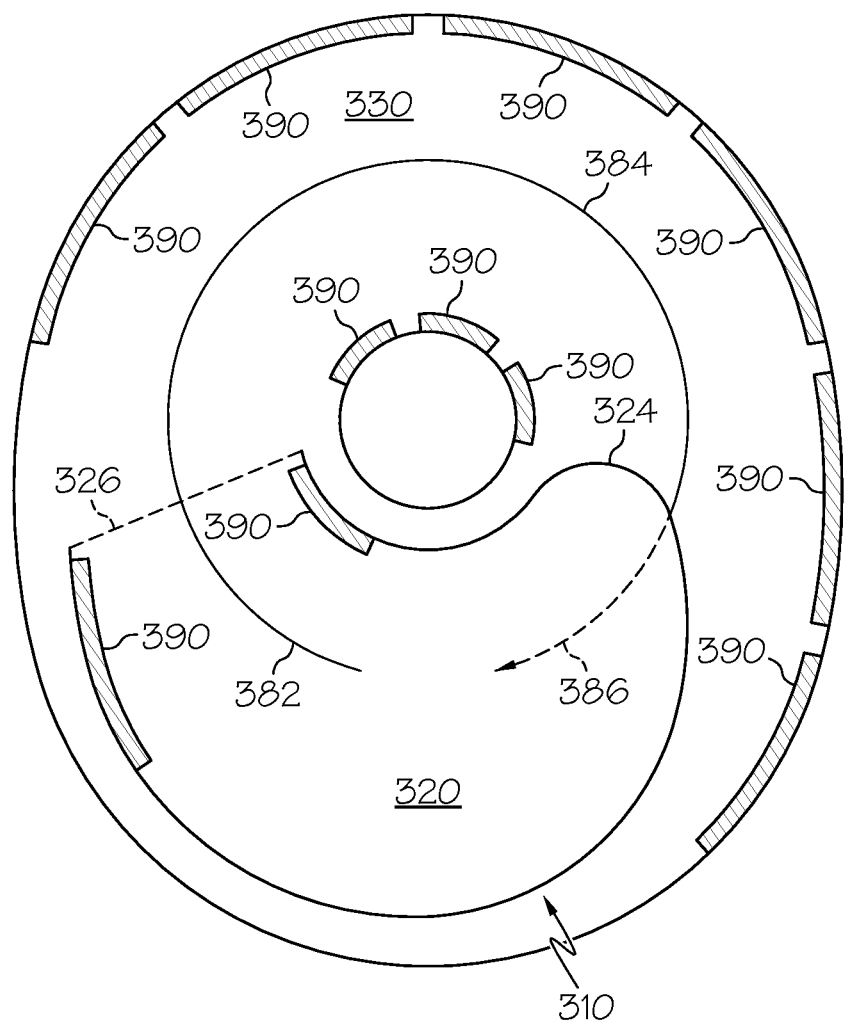
FIG. 6 is a radial cross-sectional view of the inlet assembly of FIG. 3 through line 6-6 according to an exemplary embodiment.

The inlet assembly 220 is shown in greater detail in FIGS. 3-6. In particular, FIG. 3 is a more detailed axial cross-sectional view of the inlet assembly 220 of the turboprop 150 of FIG. 2 according to an exemplary embodiment. FIG. 4 is a radial cross-sectional view of the inlet assembly 220 through line 4-4 of FIG. 3. FIG. 5 is a partial isometric view of an inlet assembly 220 according to an exemplary embodiment, and FIG. 6 is a radial cross-sectional view of the inlet assembly 220 through line 6-6 of FIG. 3 according to an exemplary embodiment. In FIG. 5, portions of the cowling 152 have been removed to more clearly illustrate other aspects of the inlet assembly 220. FIGS. 3-6 will be discussed together below.

In general, the inlet assembly 220 is behind (or aft) of the hub 264 on which the propellers 154 (FIG. 1) are mounted. In this embodiment, the inlet assembly 220 circumscribes the gearbox 230. As noted above, in the context of engine operation, the inlet assembly 220 functions to direct air from the atmosphere into the compressor section 240 (FIG. 2).

The inlet assembly 220 includes a forward inlet guide 310 with forward ends that at least partially define a first inlet 312 (or "aircraft inlet" 312). As particularly shown in the cross-sectional view of FIG. 4, the aircraft inlet 312 is generally crescent shaped and located aft and underneath the hub 264 of the aircraft. Other configurations and shapes of the aircraft inlet 312 are possible. For example, the aircraft inlet 312 may be positioned above the gearbox 230 and hub 264.

The forward inlet guide 310 further defines an inlet plenum 320 within the interior of the inlet assembly 220. As is shown in FIG. 6, the forward inlet guide 310, and thus the inlet plenum 320, may be considered to have a first, circumferentially closed end 324 and a second, circumferentially open end 326. The open end 326 of the inlet plenum 320 is fluidly coupled to an expansion plenum 330. In this exemplary embodiment, the expansion plenum 330 is at least partially defined by the cowling 152 and gearbox 230 in the radial directions. As described in greater detail below, the inlet plenum 320 and the expansion plenum 330 combine to form a generally annular flow path for the air flowing through the inlet assembly 220. In one exemplary embodiment, the flow path may be considered a toroid-type shape with disconnected ends.

The expansion plenum 330 extends from the inlet plenum 320 to a position axially aft of the aircraft inlet 312. A second inlet 342 (or "engine inlet" 342) is fluidly coupled to the expansion plenum 330. In one exemplary embodiment, the engine inlet 342 is defined by a bellmouth guide 340, e.g., a guide with radially diverging edges. As best shown in FIG. 3, the engine inlet 342 may be directly behind the aircraft inlet 312 in the axial direction. In other words, the engine inlet 342 may have a central axis 344 that is circumferentially aligned with a central axis 314 of the aircraft inlet 312. Additional structural details about the inlet assembly 220 are described below after an introduction to the operation of air flowing through the inlet assembly 220.

During operation, air flows into the aircraft inlet 312 from the atmosphere, as shown by arrow 380. As noted above, the aircraft inlet 312 may generally have a size and shape to allow the desired amount of air into the inlet assembly 220. As shown by arrow 382, the air flowing through the aircraft inlet 312 is directed by the forward inlet guide 310 into the inlet plenum 320. The air flows through the inlet plenum to the expansion plenum 330, as indicated by arrow 384. As noted above and as best shown in FIG. 6, the forward inlet guide 310 has a closed end 324 and an open end 326 such that the air generally flows through the inlet plenum 320 in a clockwise direction around the inlet assembly 220 when viewed from the front. From the expansion plenum 330, the air flows into the engine inlet 342, as indicated by arrow 386, and subsequently into the compressor section 240 (FIG. 2) for power generation.

Despite the central axis 314 of the aircraft inlet 312 and the central axis 344 of the engine inlet 342 being circumferentially aligned, there is no "direct line of sight" between the aircraft inlet 312 and the engine inlet 342 with respect to the airflow as a result of the inlet plenum 320 and expansion plenum 330. In other words, the air is directed in a circumferential direction between the aircraft inlet 312 and the engine inlet 342, e.g., around the inlet assembly 220, rather than a primarily axial flow path. In one exemplary embodiment, the inlet plenum 320 and expansion plenum 330 direct air about at least a path of 90° and typically an annular path of between about 180° and 360° relative to the annular inlet assembly 220. As noted below, this result in a flow path with a relatively large volume.

The inlet assembly 220 provides a number of acoustical advantages relative to conventional turboprop inlets. In particular, as noted above, the inlet plenum 320 and expansion plenum 330 extend in an annular circumferential direction about the inlet assembly 220. As such, the inlet plenum 320 and particularly the expansion plenum 330 have a larger volume than the engine inlet 342 and a larger volume than similar inlet plenum(s) that extend directly (or straight) into the engine inlet. For example, the engine inlet 342 has a smaller cross-sectional area (e.g., perpendicular to the flow path and as shown in FIG. 4) that the circumferential cross-sectional areas along the flow path within the inlet plenum 320 and the expansion plenum 330. As a result, any noise, particularly low frequency noise, traveling from the engine through the engine inlet 342 may be dampened by the increase in volume of the expansion plenum 330 The expansion plenum 330 has a volume that is typically two to ten times larger than the volume of the engine inlet 340.

Additionally, sound absorbing material 390 may be disposed along the inlet plenum 320 and the expansion plenum 330, as is schematically shown in FIG. 6. The sound absorbing material 390 may be arranged in sections or continuously along any surface or circumferential position of the inlet plenum 320 and expansion plenum 330. The sound absorbing material 390 functions to absorb at least some of the noise associated with the engine and at least partially prevents noise from the engine from traveling through and out of the inlet assembly 220. The sound absorbing material 390 may be any suitable material capable of damping noise, such as, for example, a porous material bonded to a honeycomb material, a porous material having baffles therein, or a bulk material. The sound absorbing material 390 may be metal, composite, or plastic solid or foam material. It may be placed on any surface that is exposed to the air flow through the inlet plenum 320 and the expansion plenum 330. In one exemplary embodiment the sound absorbing material 390 is melamine foam.

As best shown in FIG. 3, the inlet assembly 220 further includes a blocker plate 392 arranged between the engine inlet 342 and the forward inlet guide 310. The blocker plate 392 functions to absorb and/or reflect sound traveling through the engine inlet 342 from the engine. In the depicted exemplary embodiment, the blocker plate 392 is vertically arranged adjacent to the engine inlet 342, e.g., the blocker plate 392 is generally perpendicular to the direction of flow through the engine inlet 342. The blocker plate 392 may be approximately the same size and/or slightly larger than the engine inlet 342. As such, the blocker plate 392 is advantageously sized and positioned between the engine inlet 342 and the aircraft inlet 312 to block noise form the engine inlet 342 from traveling out of the inlet assembly 220. Accordingly, the blocker plate 392 provides a direct path sound attenuation between the engine inlet 342 and the aircraft inlet 312. The blocker plate 392 reflects the noise traveling out of the engine inlet back into the engine inlet 342 and the expansion plenum 330. The blocker plate 392 may also be covered with sound absorbing material 390, as described above.

In one exemplary embodiment, the inlet plenum 320 is disconnected from (e.g., not directly connected to) the engine inlet 344. This enables the inlet plenum 320 to be designed and installed separate from the engine inlet 344. Additionally, although the inlet plenum 320 and expansion plenum 330 form a curved flow path, the radius of curvature is relatively large, thus enabling the noise reduction discussed above while minimizing flow loses in advance of the compressor section. In general, the noise suppression within the inlet assembly does not unduly restrict the air flow into the turboprop 150.

As described above, FIGS. 2-6 depict an inlet assembly 220 with a flow path that is annular or otherwise tortuous about the gearbox 230 to provide sufficient volume to reduce engine noise. However, alternate embodiments may provide such volume in other arrangements. An additional embodiment for reducing engine noise is described below with reference to FIGS. 7-10.

Figure 7:
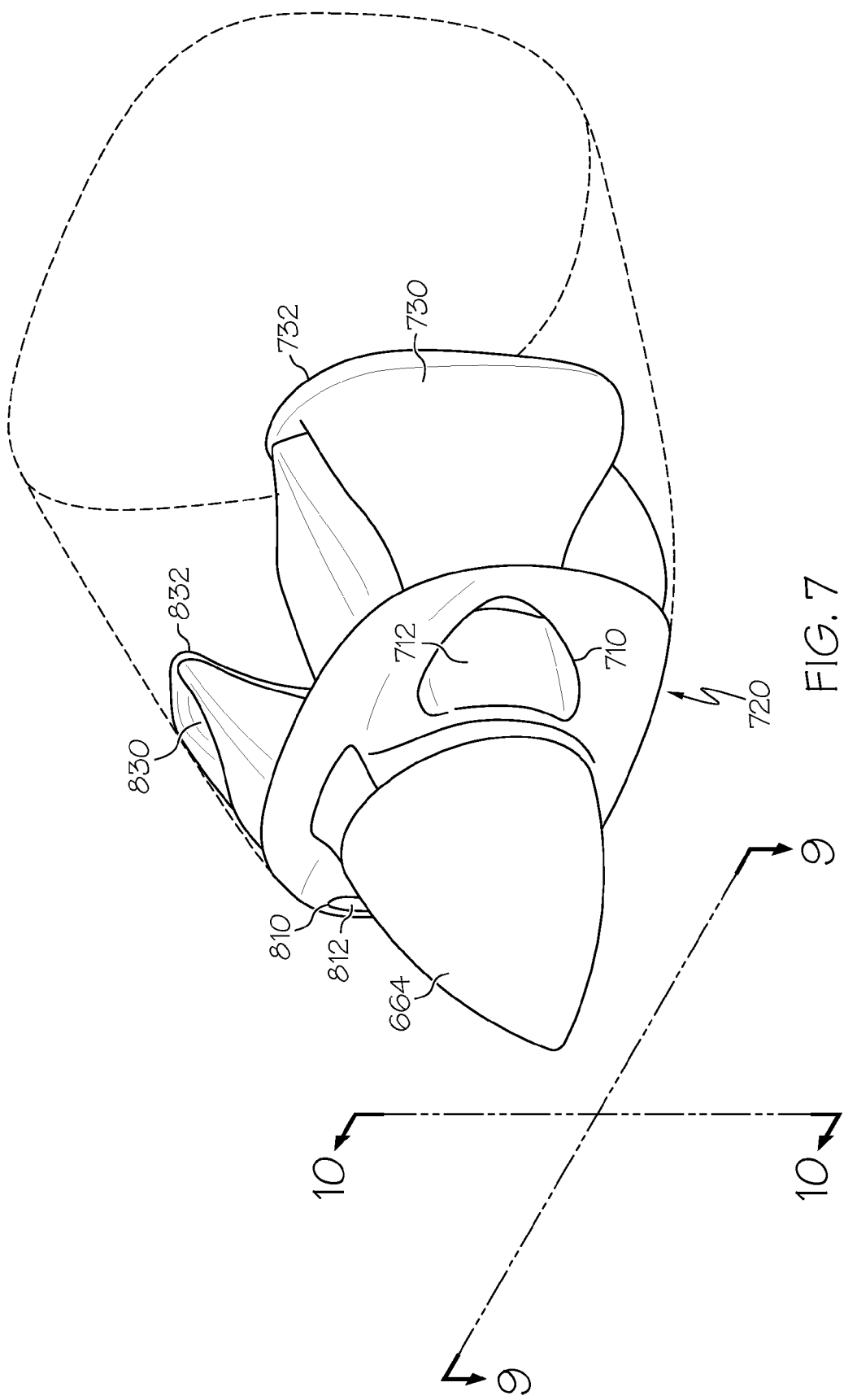
FIG. 7 is a partial front isometric view of an inlet assembly according to another exemplary embodiment.
Figure 8:
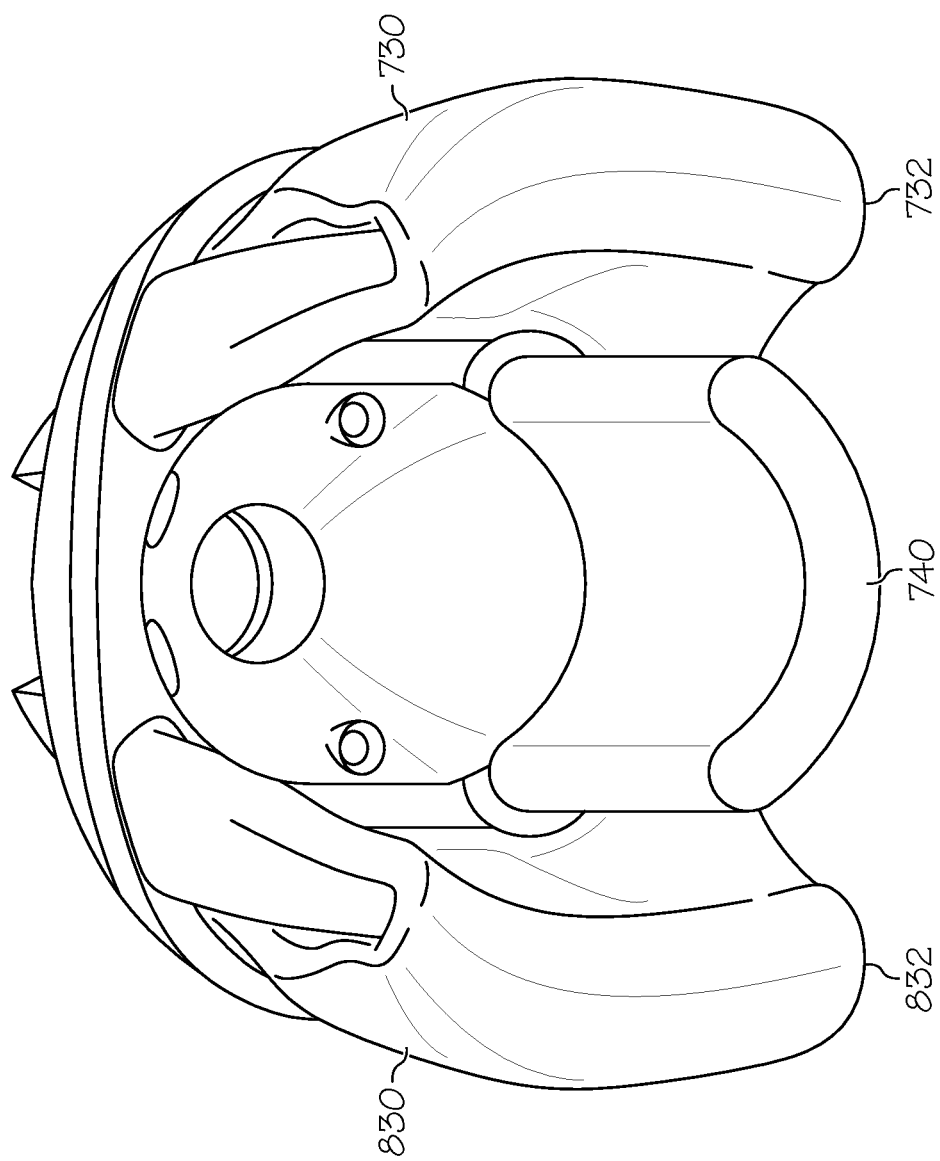
FIG. 8 is a partial rear isometric view of an inlet assembly of FIG. 7 according to another exemplary embodiment.
Figure 9:
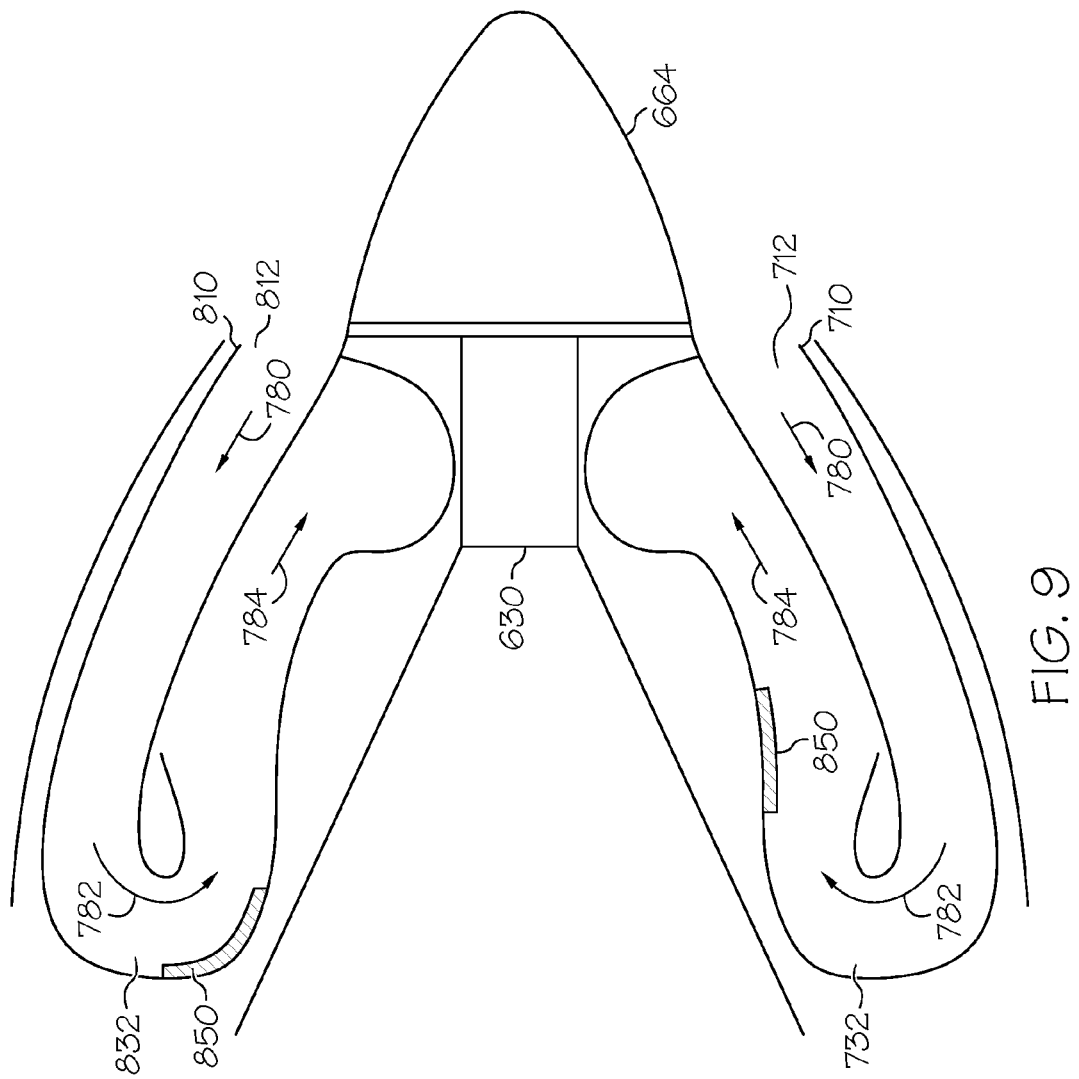
FIG. 9 is a first cross-sectional view of the inlet assembly of FIG. 7 through line 9-9 according to another exemplary embodiment.
Figure 10:
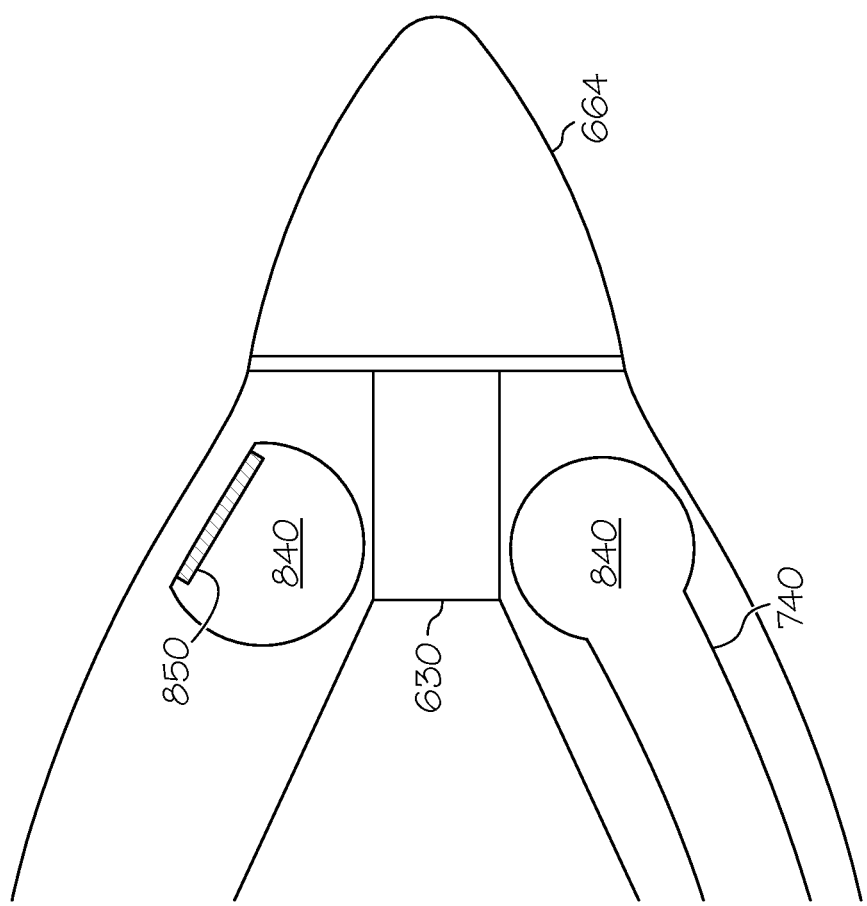
FIG. 10 is a second cross-sectional view of the inlet assembly of FIG. 7 through line 10-10 according to another exemplary embodiment.

FIG. 7 is a partial front isometric view of an inlet assembly 720 according to an alternate exemplary embodiment. FIG. 8 is a partial rear isometric view of the inlet assembly 720. FIG. 9 is a first cross-sectional view of the inlet assembly 720 of FIG. 7 through line 9-9, and FIG. 10 is a second cross-sectional view of the inlet assembly of FIG. 7 through line 10-10. Unless otherwise noted below, the inlet assembly 720 is similar to the inlet assembly 220 described above.

Unlike the inlet assembly 220 depicted in FIGS. 2-6, the inlet assembly 720 in FIGS. 7-10 has two aircraft inlets 712, 812 on either side of the hub 664 respectfully defined by forward inlet guides 710, 810. The forward inlet guides 710, 810 may further define inlet plenums 712, 812 within the interior of the inlet assembly 720. Each of the forward inlet guides 710, 810 are coupled to an expansion plenum 730, 830.

The expansion plenums 730, 830 each define a flow path in which the air flow travels at least 90°, and in the depicted embodiment, at least 180° relative to the axial direction. In other words, as air flow enters the expansion plenums 730, 830, the air flows in a first direction and is guided in a second direction, which is about 180° relative to the first direction. In particular, in the embodiment of FIG. 9, the air initially flows in a generally aft, axial direction, as indicated by arrow 780. Subsequently, the expansion plenums 730, 830 each have a bend 732, 832 such that the air is directed radially inward and then generally forward in the axial direction, as indicated by arrows 782. The bends 732, 832 are most clearly shown in the rear view of FIG. 8.

The air flow then continues from the expansion plenums 730, 830 into an annular plenum 840 that is in fluid communication with both expansion plenums 730, 830, as indicated by arrow 784. The air then flows in a generally annular or circumferential direction at least partially about the gearbox 630 into an engine inlet 740. The engine inlet 740 may be located at any position relative to the annular plenum 840, although in the depicted embodiment, the engine inlet 740 is positioned generally underneath the gearbox 630, similar to the position of the engine inlet 342 of FIGS. 2-6 and about 90° relative to each of the aircraft inlets 712, 812. The engine inlet 740 is most clearly shown in FIGS. 8 and 10.

Accordingly, the expansion plenums 730, 830 and annular plenum 840 define a flow path between the aircraft inlets 712, 812 and the engine inlet 740 with a volume sufficient to dampen any noise traveling through the engine inlet 740 into the inlet assembly 720. Additionally, as in the other embodiments, the flow path between the aircraft inlets 712, 812 and the engine inlet 740 does not provide a direct line of sight such that sound does not travel directly out. Given the lack of direct lines of sight, both inlet assemblies 220, 720 may be described as defining as tortuous flow paths. Moreover, as also noted above, the expansion plenums 730, 830 and annular plenum 840 may be provided with sound absorbing material 850 at any suitable location to absorb sound travelling from the engine inlet 740.

The inlet assemblies 220, 720 are described above with respect to an exemplary configuration on an exemplary turboprop 150, e.g., a turboprop 150 for a fixed wing aircraft. It will be understood however that the exemplary embodiments are also applicable to any type of gas turbine engine with an inlet duct and a forwardly projecting shaft or gearbox such as a rotary wing aircraft, an auxiliary power unit, or stationary electric generator engine. Exemplary embodiments may also be adapted for non-aircraft applications such as locomotives, ships, military vehicles, fossil fuel pumping and electrical power generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet assembly for a turboprop engine system, comprising:
    an inlet plenum defining first inlet configured to receive air from the atmosphere;
    an expansion plenum coupled to the inlet plenum and configured to receive the air from the inlet plenum, the inlet plenum and the expansion plenum defining a flow path for the air with a bend of at least 90°; and
    a second inlet coupled to the expansion plenum and configured to receive the air from the expansion plenum, wherein the flow path is an annular flow path,
    wherein the second inlet is positioned at least 90° along the annular flow path relative to the first inlet.

2. The inlet assembly of claim 1, wherein the second inlet has a first cross-sectional area and the expansion plenum has a second cross-sectional area, the second cross-sectional being greater than the first cross-sectional area.

3. The inlet assembly of claim 1, wherein the second inlet is positioned approximately 360° along the annular flow path relative to the first inlet.

4. The inlet assembly of claim 1, wherein the bend is at least 180°.

5. The inlet assembly of claim 1, wherein the bend directs the air from a first axial direction to a second axial direction, the first axial direction being opposite to the second axial direction.

6. The inlet assembly of claim 1, further comprising an annular plenum coupled between the expansion plenum and the second inlet, the annular plenum extending at least partially around a gearbox of the turboprop engine system.

7. The inlet assembly of claim 1, further comprising an inlet guide defining the first inlet and the inlet plenum.

8. The inlet assembly of claim 7, further comprising a bellmouth guide defining the second inlet.

9. The inlet assembly of claim 8, wherein the inlet guide is separate from the bellmouth guide.

10. The inlet assembly of claim 1, further comprising sound absorbing material positioned in the expansion plenum to absorb sound from the second inlet.

11. The inlet assembly of claim 10, wherein the sound absorbing material is a panel of melamine foam.

12. The inlet assembly of claim 1, further comprising a blocker plate positioned proximate to the second inlet.

13. The inlet assembly of claim 12, wherein the blocker plate is positioned between the first inlet and the second inlet.

14. The inlet assembly of claim 12, wherein the blocker plate at least partially defines the expansion plenum.

15. An inlet assembly for a turboprop engine system, comprising:
    an inlet plenum defining first inlet configured to receive air from the atmosphere;
    an expansion plenum coupled to the inlet plenum and configured to receive the air from the inlet plenum, the inlet plenum and the expansion plenum defining a flow path for the air with a bend of at least 90'; and
    a second inlet coupled to the expansion plenum and configured to receive the air from the expansion plenum, wherein the flow path is an annular flow path,
    wherein the second inlet is positioned at least 180° along the annular flow path relative to the first inlet.

16. A turboprop engine system, comprising:
    an engine with an engine inlet;
    a shaft coupled to the engine and configured to be rotated by the engine;
    a cowling enclosing the engine and the shaft;
    a propeller positioned outside of the cowling, the propeller being coupled to the shaft and configured to be driven by the shaft; and
    an inlet assembly with an aircraft inlet, the inlet assembly configured to receive air from the atmosphere through the aircraft inlet and to provide the air to the engine inlet of the engine, the inlet assembly comprising a first plenum at least partially defining a flow path for the air between the aircraft inlet and the engine inlet, first plenum having a bend of at least 90°,
    wherein the flow path is an annular flow path, and wherein the engine inlet is positioned at least 180° along the annular flow path relative to the aircraft inlet.

17. The turboprop engine system of claim 16, further comprising a gearbox for coupling the shaft to the propeller, wherein the first plenum is configured such that the flow path is an annular flow path extending around the gearbox.

18. The turboprop engine system of claim 16, wherein the bend directs the air from a first axial direction to a second axial direction, the first axial direction being opposite to the second axial direction.

* * * * *